(12) United States Patent
Esswie

(10) Patent No.: US 12,506,561 B2
(45) Date of Patent: Dec. 23, 2025

(54) RADIO OVERHEAD REDUCTION OF RELIABLE 5G MULTICAST BROADCAST SERVICES

(71) Applicant: DELL PRODUCTS L.P., Round Rock, TX (US)

(72) Inventor: Ali Esswie, Montreal (CA)

(73) Assignee: Dell Products L.P., Round Rock, TX (US)

( * ) Notice: Subject to any disclaimer, the term of this patent is extended or adjusted under 35 U.S.C. 154(b) by 545 days.

(21) Appl. No.: 17/973,226

(22) Filed: Oct. 25, 2022

(65) Prior Publication Data
US 2024/0137158 A1 Apr. 25, 2024
US 2024/0235742 A9 Jul. 11, 2024

(51) Int. Cl.
*H04L 1/18* (2023.01)
*H04L 1/08* (2006.01)
*H04L 1/1812* (2023.01)
*H04W 4/06* (2009.01)

(52) U.S. Cl.
CPC .............. *H04L 1/1812* (2013.01); *H04L 1/08* (2013.01); *H04W 4/06* (2013.01)

(58) Field of Classification Search
CPC . H04L 1/1812; H04L 1/08; H04L 2001/0092; H04L 2001/0093; H04L 1/1861; H04W 4/06
See application file for complete search history.

(56) References Cited

U.S. PATENT DOCUMENTS

| 11,425,678 | B2 | 8/2022 | Files et al. | |
|---|---|---|---|---|
| 2020/0052832 | A1* | 2/2020 | Tian | H04L 1/1614 |
| 2022/0159417 | A1* | 5/2022 | Zhou | H04W 72/23 |
| 2022/0159543 | A1 | 5/2022 | Cheong et al. | |
| 2024/0049297 | A1* | 2/2024 | Khoshkholgh Dashtaki | H04B 7/18513 |
| 2024/0340922 | A1* | 10/2024 | Ko | H04W 72/25 |

* cited by examiner

*Primary Examiner* — Kwang B Yao
*Assistant Examiner* — Patrick Yipao Pei
(74) *Attorney, Agent, or Firm* — Larson Newman, LLP

(57) ABSTRACT

An information handling system within a broadcast system includes a memory and a processor. The memory stores a hybrid automatic repeat request (HARQ) acknowledgment/negative acknowledgement (ACK/NACK) codebook. The processor receives multicast broadcast service (MBS) HARQ configurations and the HARQ ACK/NACK codebook. The processor receives an MBS payload one of a plurality of available downlink beams, and determines whether a decoding of the payload is successful or failed. In response to the decoding of the payload having failed, the processor provides a HARQ preamble on the one of the available downlink beams. The HARQ preamble identifies that the decoding of the payload has failed on the one of the available downlink beams.

17 Claims, 8 Drawing Sheets

RADIO OVERHEAD REDUCTION OF RELIABLE 5G MULTICAST BROADCAST SERVICES

CROSS REFERENCE TO RELATED APPLICATION

Related subject matter is contained in co-pending U.S. patent application Ser. No. 17/973,275 entitled "GROUP LINK ADAPTATION OF 5G MULTICAST BROADCAST SERVICES," filed Oct. 25, 2022, the disclosure of which is hereby incorporated by reference.

FIELD OF THE DISCLOSURE

This disclosure generally relates to information handling systems, and more particularly relates to radio overhead reduction of reliable 5G multicast broadcast services.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system within a broadcast system may store a hybrid automatic repeat request (HARQ) acknowledgment/negative acknowledgement (ACK/NACK) codebook. The system may receive multicast broadcast service (MBS) HARQ configurations and the HARQ ACK/NACK codebook. The system may receive an MBS payload via one of a plurality of available downlink beams. If a decoding of the payload fails, then the system may provide a HARQ preamble on the one of the available downlink beams. The HARQ preamble identifies that the decoding of the payload has failed on the one of the available downlink beams.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
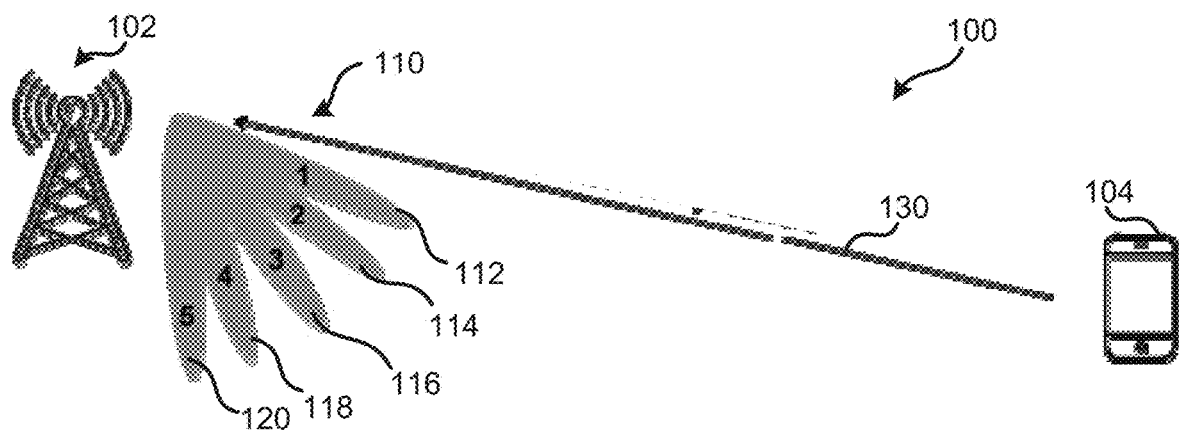
FIGS. 1 and 2 are diagrams of a broadcast system according to an embodiment of the present disclosure.
Figure 2:
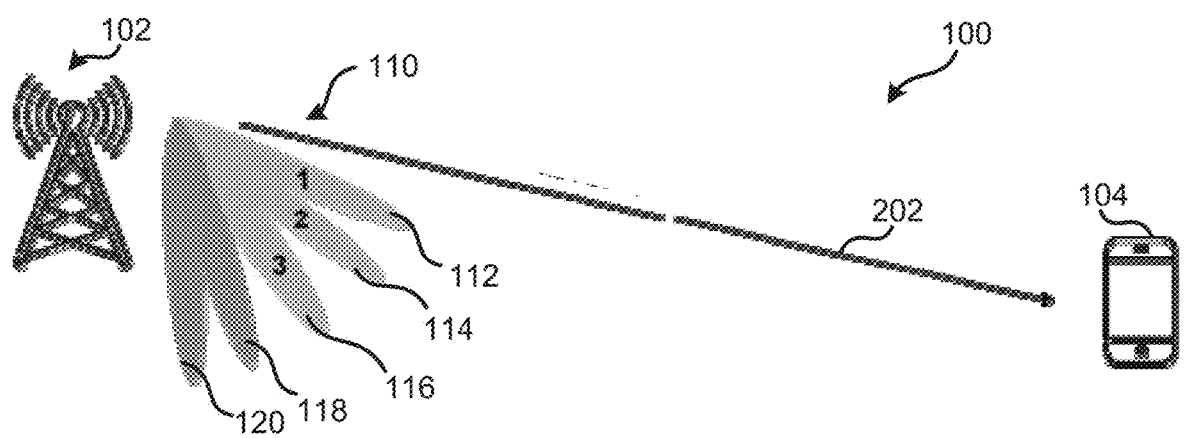

FIGS. 1 and 2 illustrate a broadcast system 100 for an information handling system according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), blade server or rack server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Broadcast system 100 includes a radio access network (RAN) node 102 and an information handling system 104. RAN node 102 includes a transmission and reception antenna, such as a transmission and reception tower. In certain examples, RAN node 102 and information handling system 104 may both be substantially similar to information handling system 900 of FIG. 9 and include any components illustrated in FIG. 9. However, for clarity and brevity the components internal of RAN node 102 and the components of information handling system 104 are not illustrated in FIGS. 1 and 2 but only illustrated in FIG. 9. For example, RAN node 102 and information handling system 104 each include a processor, such as processor 902 of FIG. 9.

In an example, RAN node 102 may transmit multiple downlink communication beams 110 including, but not limited to, downlink beams 112, 114, 116, 118, and 120. In certain examples, each of downlink beams 110 may cover a different range or area of a broadcast region. While only downlink beams 112, 114, 116, 118, and 120 are illustrate in FIGS. 1 and 2, RAN node 102 may transmit additional downlink beams to cover 360-degree range without varying from the scope of this disclosure. In an example, RAN node 102 may transmit data via any suitable technology, such as 5G or the like.

In certain examples, multicast broadcast service (MBS) services require various levels of reliability. For example, one level of reliability for MBS may be maintained by employing standardized hybrid automatic repeat request (HARQ) retransmission procedures. In this example, an MBS payload is retransmitted by RAN node 102 upon failure of information handling system 104 receiving a first MBS payload transmission.

In previous information handling systems, existing HARQ retransmissions schemes for MBS services require a significant amount of signaling overhead due to the nature of the MBS deployments with a large number of MBS devices. Several solutions for no HARQ feedback or negative acknowledgement (NACK) only HARQ feedback for MBS traffic are specified. However, in these previous information handling systems, these solutions may reduce an ability to provide a clear MBS traffic reliability. This degradation of reliability may not be tolerated for some MBS services such as MBS autonomous car driving assistance use cases. In previous information handling systems, MBS HARQ schemes, such as ACK/NACK reporting, NACK only reporting, no ACK/NACK reporting, or the like, may result in a significant signaling overhead consuming the uplink control channel capacity to maintain a reasonable MBS service reliability, may severely degrade the achievable MBS reliability level with minimal feedback signaling overhead size, or the like. Broadcast system 100, and more specifically RAN node 102 and information handling system 104, may be improved by a reduction in HARQ signaling overhead of MBS traffic. For example, a group of information handling systems 104 that are in proximity of each other may share and provide a single HARQ feedback report as will be described herein.

During handshake operations between RAN node 102 and information handling system 104, the RAN node may define and transmit a codebook or a mapping list of MBS HARQ preambles to a subset of the available downlink beams, such as downlink beams 112, 114, 116, 118, and 120. In an example, each information handling system 102 that receives HARQ ACK/NACK codebook or table may store the codebook in a memory of the information handling system, such as memory 920 of FIG. 9. An exemplary HARQ ACK/NACK codebook is provided in Table 1 below:

TABLE 1

| HARQ preamble/sequence/code ID | Associated downlink beams |
|---|---|
| HARQ ACK/NACK Preamble 1 | Beam indices 112, 114, . . . , n |
| . . . | . . . |
| HARQ ACK/NACK Preamble 2 | Beam indices 116, 118, . . . , n |

As shown in Table 1, HARQ ACK/NACK Preamble 1 may be associated with multiple downlink beams including, but not limited to, beams 112 and 114 of FIG. 1. HARQ ACK/NACK Preamble 2 may be associated with multiple downlink beams including, but not limited to, beams 116 and 118 of FIG. 1.

After the HARQ ACK/NACK codebook has been transmitted to information handling system 104 and the handshake has been completed, RAN node 102 may provide a first MBS transmission on any downlink beam 110 that may have an information handling system in that direction. For example, RAN node 102 may provide the first MBS transmission on downlink beams 112, 114, and 116. In this example, information handling system 104 may receive the first MBS transmission on all three downlink beams 112, 114, and 116. Based on the MBS transmission being received on multiple downlink beams, information handling system 104 may select a strongest downlink beam for the information handling system. In an example, the information handling system 104 may select the strongest downlink beam in any suitable manner known in the art.

Based on reception of the MBS transmission, information handling system 104 may attempt to decode the transmission. Upon a failed or successful decoding of the first MBS transmission, information handling system 104 may select the HARQ NACK or ACK preamble that is associated with its selected strongest downlink beam, such as beam 112. For example, if information handling system 104 failed to decode the first MBS transmission, the information handling system may HARQ NACK preamble 1 during a specified MBS HARQ resource occasion as indicated by arrow 130 in FIG. 1. In an example, as used herein resource occasion may be referred to as the downlink beam associated with the HARQ preamble, such as downlink beam 112 associated with HARQ preamble 1 or downlink beam 116 associated with HARQ preamble 2.

In an example, information handling system 104 may utilize the beam sequence indicated in Table 1 above to indicate the beams that provided a successfully decoded MBS transmission and the beam that did not provide a successfully decoded transmission. For example, information handling system 104 may provide a HARQ preamble 1 (1,0) to indicate that the MBS transmission on downlink beam 112 failed to be decoded and the MBS transmission on downlink beam 114 was successfully decoded. In an example, a digital '1' may be utilized to indicate a failure to decode the MBS payload and a digital '0' may be utilized to indicate a successful decode of the MBS payload. In this example, the use of digital '1' to indicate a failure may provide additional reliability because errors in transmission may cause a digital '0' to easily change to a digital '1'. The reliability is increased by having a false NACK message, such that the MBS payload is re-transmitted, instead of a false ACK message where the MBS payload should be re-transmitted and is not re-transmitted. In certain examples, multiple devices or information handling systems served by any of the downlink beams belonging to the defined subset of beams, such as beam 112 and 114 for preamble 1, may transmit the same HARQ preamble, and not consume the uplink control channel capacity.

Upon receiving an MBS HARQ preamble, such as HARQ NACK preamble 1, RAN node 102 may re-transmit the MBS payload only over the resource occasion associated with the downlink beams that are tied with the signaled HARQ preamble, such as downlink beams 12 and 114 associated with HARQ preamble 1. In an example, the re-transmission of the MBS payload is indicated by arrow 202 of FIG. 2. While RAN node 102 is re-transmitting the MBS payload on the resource occasion associated with HARQ preamble 1, RAN node 102 may utilize the remaining resources for other MBS or non-MBS transmissions.

RAN node 102 may be improved by the used on HARQ preambles based on the HARQ feedback signaling may be provided with an overhead reduction due to multiple MBS devices transmitting the same preamble over the same uplink resource. Additionally, RAN node 102 may be improved by implementing better resource utilization because the RAN node only re-transmits the MBS payload over the resources that are associated with the downlink beams tied to a received HARQ preamble. In this example, RAN node 102 may utilize the other beam resource occasions for other useful transmissions. RAN node 102 may also be improved by the number of required available HARQ ACK/NACK preambles should be reasonable low because the preambles are tied to the available downlink beams rather than the large number of active MBS devices.

As described herein, there is not a requirement for a large number of available of orthogonal HARQ preambles because those are tied with downlink beams or beam subsets instead of active devices. Accordingly, due to multiple devices transmitting the same HARQ preamble, the RAN node is not aware of which MBS devices or information handling systems failed to decode the MBS transmission. However, when same content is transmitted to all devices in the MBS group, the RAN node may only need to identify that one or more of the MBS devices over a certain beam subset have failed MBS payload decoding. Based on one or more devices on the beam subset failing to properly decode, the RAN node may re-transmit the failed MBS payload only over the corresponding downlink beam subset.

Figure 3:
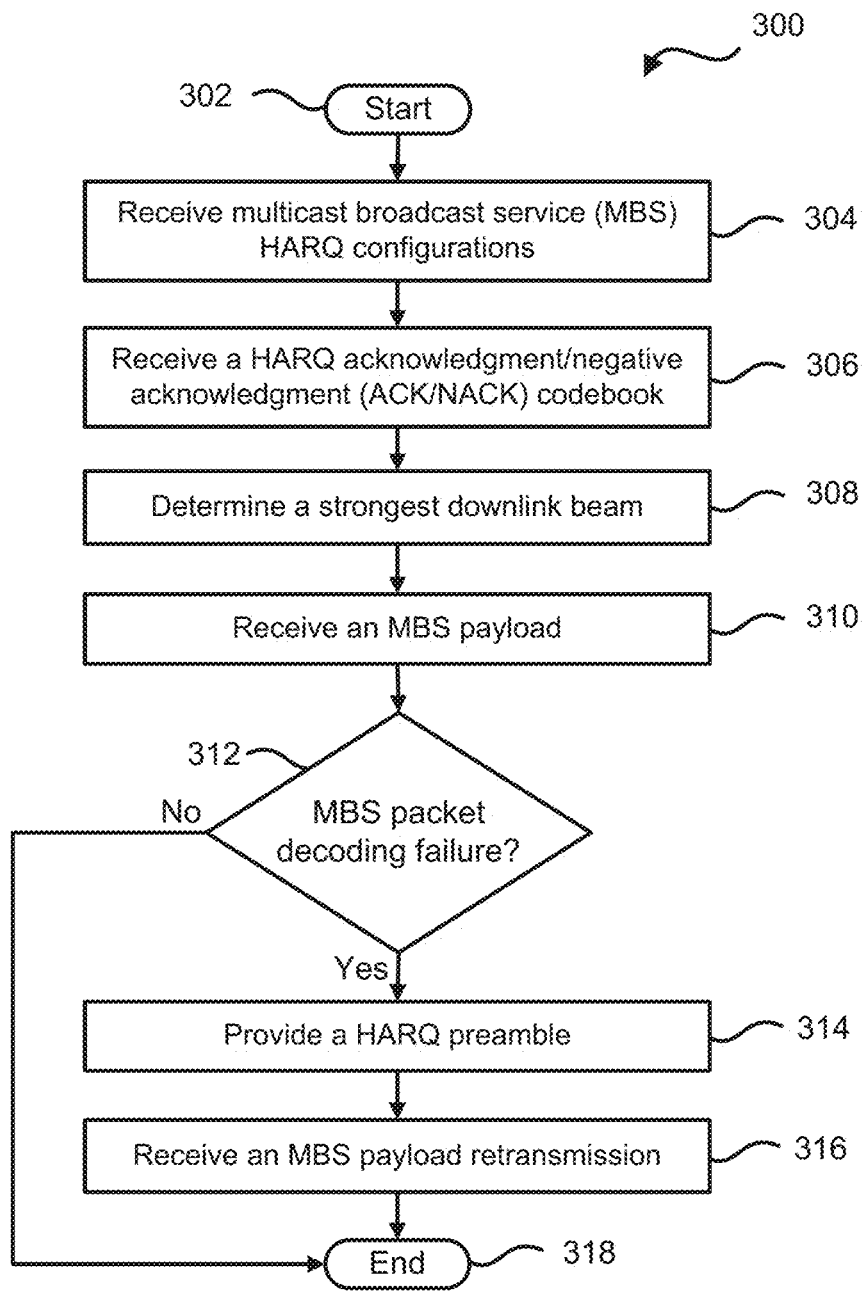
FIG. 3 is a flow diagram of a method for providing beam group specific HARQ feedback according to an embodiment of the present disclosure.

FIG. 3 is a flow diagram of a method 300 for providing beam group specific HARQ feedback according to an embodiment of the present disclosure, starting at block 302. In an example, the method 300 may be performed by any suitable component including, but not limited to, processor, such as processor 902 in FIG. 9. Not every method step set forth in this flow diagram is always necessary, and certain steps of the methods may be combined, performed simultaneously, in a different order, or perhaps omitted, without varying from the scope of the disclosure.

At block 304, MBS HARQ configurations are received. In an example, the MBS HARQ configurations may be received by an information handling system in communication with a RAN node of a broadcast system. In certain examples, the HARQ configuration may be any suitable data associated with MBS payload transmission including, but not limited to, a list or map of HARQ preambles or sequences. At block 306, a HARQ ACK/NACK preamble codebook is received. In an example, the HARQ codebook may include a list of HARQ preambles and a subset of downlink beams associated with each HARQ preamble.

At block 308, a strongest downlink beam is determined. In an example, the strongest downlink beam may be selected or determined from available downlink beam set. In certain examples, the strongest downlink beam may be determined in any suitable manner, such as based on the experienced coverage level of the synchronization signal blocks (SSBs). At block 310, a MBS payload is received. In an example, the MBS payload may be received on the determined strongest downlink beam for an information handling system. In certain examples, the RAN node may provide MBS payload transmission via a 5G technology.

At block 312, a determination is made whether a MBS packet decoding failure has occurred. If a packet failure has not occurred, the flow ends at block 318. In an example, if the failure has not occurred, a HARQ ACK preamble may be selected and provided to a RAN node over an associated MBS HARQ resource occasion. If a failure has occurred, a HARQ NACK preamble is selected and provided. In an example, the selected HARQ preamble may correspond to a subset of downlink beams that includes the determined strongest beam. In certain examples, an information handling system may transmit the selected HARQ preamble over the associated MBS HARQ resource occasion. At block 316, a re-transmission of the MBS payload is received, and the flow ends at block 318. In an example, the re-transmission may be provided and received only over the MBS HARQ resource occasion associated with the HARQ preamble.

In previous MBS systems, a standard HARQ feedback may be based on bit transmission within a control payload. As described herein, HARQ feedback transmissions may be based on sequences and/or preambles for coverage extension, resource utilization and feedback overhead reduction. In previous MBS systems, a standard HARQ feedback may be device specific, such that each device must report its own HARQ feedback report to received payload. As described herein, HARQ feedback reporting associated with each one or more of the available downlink beams. For example, the overhead associated with the HARQ feedback signaling may be proportional with the available downlink beams rather than the larger number of broadcast devices.

Figure 4:
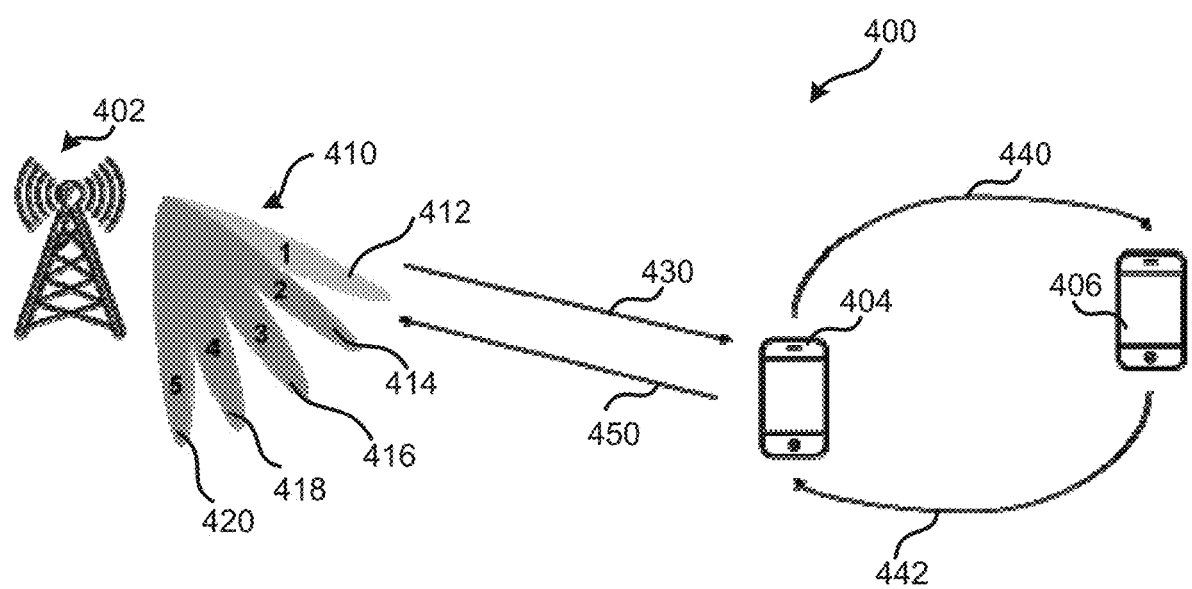
FIG. 4 is a diagram of a broadcast system according to an embodiment of the present disclosure.

FIG. 4 illustrates a broadcast system 400 according to an embodiment of the present disclosure. Broadcast system 400 includes a RAN node 402 and information handling systems 404 and 406. In an example, RAN node 402 and information handling system 404 and 406 may be substantially similar to RAN 102 and information handling system 104 of FIG. 1. In an example, RAN node 402 may transmit multiple downlink communication beams 410 including, but not limited to, downlink beams 412, 414, 416, 418, and 420. In certain examples, each of downlink beams 410 may cover a different range or area of a broadcast region. While only downlink beams 412, 414, 416, 418, and 420 are illustrate in FIG. 4, RAN node 402 may transmit any suitable number of beams without varying from the scope of this disclosure.

During handshake operations between RAN node 402 and information handling systems 404 and 406, the RAN node may define and transmit a codebook or a mapping list of MBS HARQ preambles over a subset of the available downlink beams, such as downlink beams 412, 414, 416, 418, and 420, as indicated by arrow 430. In certain examples, RAN node 402 may transmit the HARQ codebook using either RRC signaling, SIB signaling, DCI signaling, or the like. In an example, each information handling system, such as information handling systems 402 and 404, that receives HARQ ACK/NACK codebook or table may store the codebook in a memory of the information handling system, such as memory 920 of FIG. 9. An exemplary HARQ ACK/NACK codebook is provided in Table 2 below:

TABLE 2

| HARQ preamble/sequence/code ID | Device combinations: HARQ ACK (1); HARQ NACK (0) |
|---|---|
| HARQ Preamble 1 | 0; 0 |
| ... | ... |
| HARQ Preamble N | 1; 1 |

While only two HARQ Preambles are shown in Table 2, any suitable number of HARQ preambles may be included in the HARQ codebook. In an example, a HARQ ACK/NACK preamble codebook, such as illustrated in Table 2, may be defined by RAN node 402. In certain examples, each HARQ preamble may implicitly indicate a certain HARQ ACK/NACK combination of a subset of MBS devices in proximity. For instance, a 2-bit HARQ codebook may include four different HARQ preambles, and each one represents a certain HARQ ACK/NACK combination of two MBS devices in proximity. For example, a 2-bit HARQ ACK/NACK codebook may include HARQ report combinations {[ACK(1), ACK(1)], [ACK(1), NACK(0)], [NACK(0), ACK(1)], and [NACK(0), NACK(0)]}. In an example, HARQ combination codebook may be received as part of uplink control channel control information (UCI).

After the HARQ ACK/NACK codebook has been transmitted to information handling systems 404 and 406, and the handshake has been completed, RAN node 402 may transmit a MBS payload to the information handling systems. In an example, each group of MBS devices, such as information handling systems 404 and 406 that are closely geolocated may only send a single HARQ feedback report to RAN node 402. As used herein, geolocated devices may be those devices that receive a MBS payload from the same downlink beam, that have a substantially equal coverage level from RAN node 402, or the like. In an example, equal coverage levels may be determined based on the devices having a dB level above a threshold amount or below a threshold amount. In certain examples, an MBS device, such as information handling system 404, may send a HARQ ACK/NACK report request, as indicated by arrow 440, to a group of devices in proximity. In an example, the HARQ ACK/NACK report request may be sent of over a sidelink interface. Accordingly, devices in the coordination group, such as information handling system 406, may send back MBS HARQ ACK/NACK indications towards the requesting device 404 as indicated by arrow 442. Based on the MBS HARQ ACK/NACK indication from information handling system 406, requesting MBS device 404 may compile an aggregate HARQ report for all received HARQ ACK/NACK reports. Information handling system 404 may then transmit a single MBS HARQ feedback report towards RAN node 402 as indicated by arrow 450.

In an example, the aggregate HARQ report indicates a HARQ preamble or sequence that corresponds to a certain combination of HARQ ACK/NACK for information handling system 404 and the received HARQ ACK/NACK from information handling system 406. In certain examples, a sidelink coordination information handling systems 404 and 406 with two HARQ ACK reports may represented by a single HARQ preamble that identifies this information. In response to receiving a single HARQ preamble from information handling system 404, RAN node 402 may either re-transmit the MBS payload towards information handling systems 404 and 406 or neglects the payload re-transmissions when there are not any HARQ reported NACK combinations, or it is only a minority of devices reporting HARQ NACKs. In an example, the aggregate HARQ preamble may provide both a significant MBS resource efficiency and device battery power savings. These improvements may be possible because MBS devices 404 and 406 avoid transmitting similar HARQ ACK/NACK reports for the same MBS content or packet.

Figure 5:
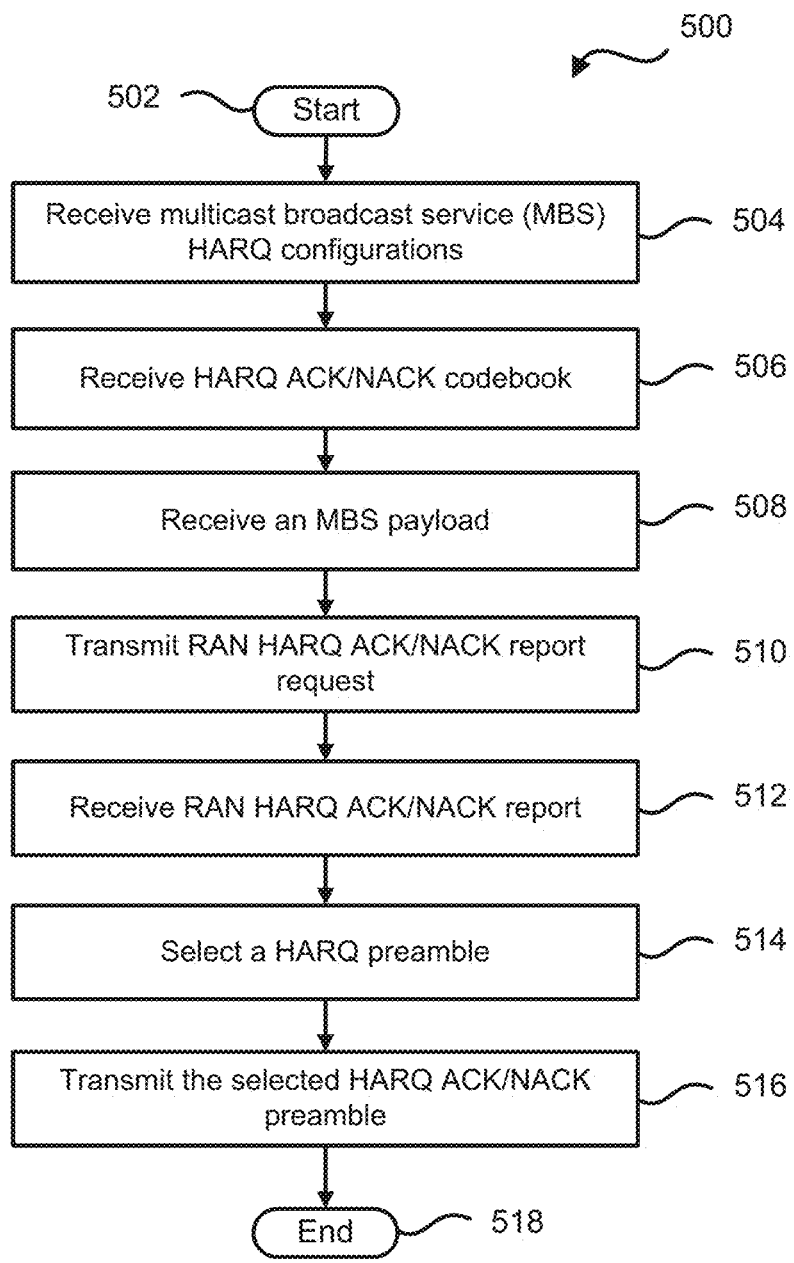
FIG. 5 is a flow diagram of a method for providing a combined HARQ acknowledgement/non-acknowledgement preamble according to an embodiment of the present disclosure.

FIG. 5 is a flow diagram of a method 500 for providing a combined HARQ acknowledgement/non-acknowledgement preamble according to an embodiment of the present disclosure, starting at block 502. In an example, the method 300 may be performed by any suitable component including, but not limited to, processor, such as processor 902 in FIG. 9. Not every method step set forth in this flow diagram is always necessary, and certain steps of the methods may be combined, performed simultaneously, in a different order, or perhaps omitted, without varying from the scope of the disclosure.

At block 504, MBS HARQ configurations are received. At block 506, a codebook with HARQ ACK/NACK preamble mapping to various device combinations of different HARQ ACK/NACK reports. At block 508, a MBS payload is received. In an example, the MBS payload may be received by an information handling system. At block 510, RAN HARQ ACK/NACK report requests are transmitted. In an example, an information handling system may transmit these requests via a sidelink to any other geolocated information handling systems.

At block 512, RAN HARQ ACK/NACK reports are received. In an example, the reports may be received via the sidelink from all geolocated devices. At block 514, a HARQ preamble is selected. In an example, the HARQ preamble may be selected from the codebook and may be based on the received reports. For example, if the requesting device has an ACK and one device reports an NACK, the selected preamble may be based associated with [ACK,NACK]. At block 516, the selected HARQ preamble is transmitted, and the flow ends at block 518. In an example, the selected HARQ preamble may be transmitted to a RAN node.

Figure 6:
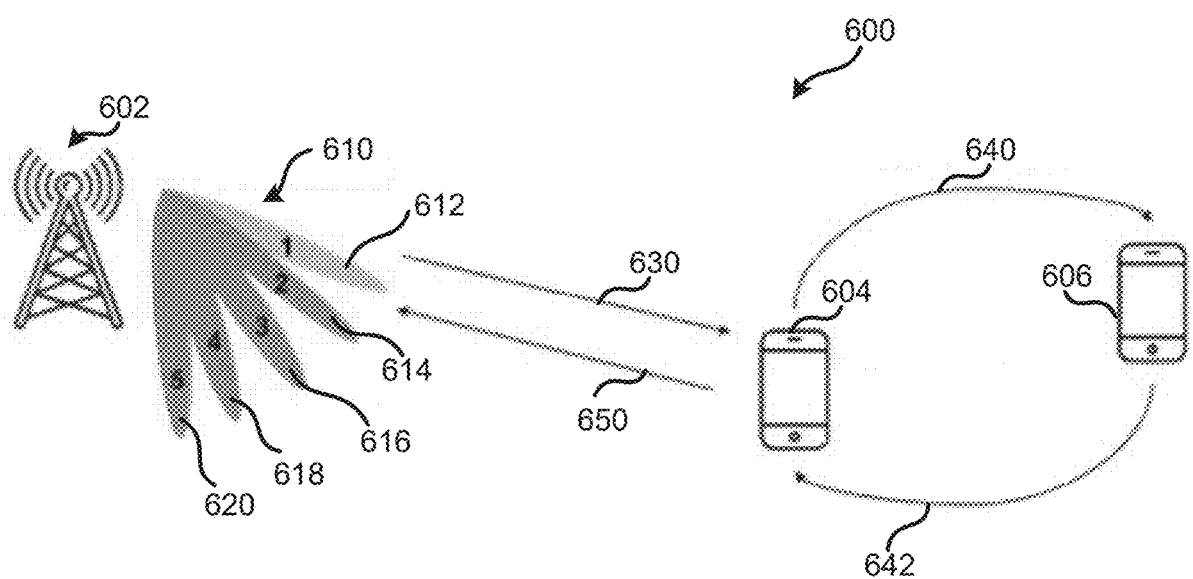
FIG. 6 is a diagram of a broadcast system according to an embodiment of the present disclosure.

FIG. 6 illustrates a broadcast system 600 according to an embodiment of the present disclosure. Broadcast system 600 includes a RAN node 602 and information handling systems 604 and 606. In an example, RAN node 602 and information handling system 604 and 606 may be substantially similar to RAN 102 and information handling system 104 of FIG. 1. As used herein, information handling systems 604 and 606 may be referred to as MBS devices 604 and 606. In an example, RAN node 602 may transmit multiple downlink communication beams 610 including, but not limited to, downlink beams 612, 614, 616, 618, and 620. In certain examples, each of downlink beams 610 may cover a different range or area of a broadcast region. While only downlink beams 612, 614, 616, 618, and 620 are illustrate in FIG. 6, RAN node 602 may transmit any suitable number of beams without varying from the scope of this disclosure. Broadcast system 600 may include additional components, such as additional information handling systems, without varying from the scope of this disclosure.

During operation, RAN node 602 may provide link adaptation (LA) configurations to MBS devices 604 and 606, which may ensure a reliable wireless performance within broadcast system 600. In an example, LA configurations indicate or identify the adaptation of the transmission configurations of each transmitted packet to the actual channel conditions of each device. In this example, MBS devices 604 and 606 may provide RAN node 602 with the channel state information reports (CSI reports) including channel quality indications (CQIs) and precoding matrix indications (PMIs). In previous broadcast systems, when there are a large number of MBS devices, the LA signaling overhead may significantly large and may consume the uplink control channel capacity. In these previous broadcast systems, the large amount of overhead may be attributed to the LA being device specific, and each device must independently signal its CSI report to the RAN node or serving cell. Improvements may be made to the amount of overhead in broadcast system 600 based on MBS devices 604 and 606 being closely located, which may be the case for MBS payload traffic. In this example, joint CSI reporting may be sufficient to reflect the channel conditions of each group of similar devices while reducing the amount of LA signaling overhead.

In an example, MBS devices, such as MBS devices 604 and 606, may be closely geolocated while streaming the same MBS content. Based on MBS devices 604 and 606 being geolocated, the MBS devices are likely to experience similar channel conditions with slight device-specific variations. As will be described herein, each group of MBS devices, such as MBS devices 604 and 606, which are closely geolocated and are served by the same downlink beams of beams 610, may coordinate on reporting a single LA report. In an example, the single LA report may reflect a filtered view of the inter-device channel conditions. In certain examples, MBS devices 604 and 606 may provide RAN node 602 with an updated LA report only when the coverage drops below a threshold.

In an example, when MBS devices 604 and 606 experience a good channel condition, the transmission configurations for the MBS devices may include aggressive modulation and coding schemes. In this example, MBS devices 604 and 606 may receive a higher data rate with a moderate coding strength due to its good channel conditions. In certain examples, RAN node 602 may configure a set of MBS devices to be primary LA devices. These primary LA devices may collect LA reports from other devices in proximity, perform LA filtering and compile a single LA report that reflects the LA for all devices in the coordination group.

In certain examples, RAN node 602 may provide group LA configurations to primary MBS device 604 as indicated by arrow 630. In response to receiving the LA configurations, MBS device 604 may initiate a sidelink connection with sidelink MBS device 606. Primary MBS device 604 may transmit an MBS LA reporting request as indicated by arrow 640. In an example, the MBS LA reporting request may be scrambled by an MBS LA group ID/sequence so that only MBS devices, such as device 606 may respond to the reporting request. In response to receiving the LA reporting request, MBS device 606 may transmit a respective LA report to MBS device 604 as indicated by arrow 642. In an example, the LA report associated with MBS device 606 may include CQI and PMI indications for the MBS device.

Based on the LA report from MBS device 606, primary MBS device 604 may apply LA report filtering, on the received LA report and its own LA report. In an example, the filtering type and coefficients may be preconfigured by RAN node 602. For example, the filter type may include, but is not limited to, a worst LA reporting, an average LA reporting, and special filtering reporting}. In an example, based on a worst LA reporting type, primary MBS device 604 may transmit a single LA report, based on only the worst LA report between MBS device 604 and MBS device 606. In certain examples, MBS device 606 may periodically transmit LA reports, may provide the LA report in response to receiving an MB S LA reporting request from MBS device 604, or the like. Different operations for compiling a single LA report will be described with respect to FIGS. 7 and 8 below.

Figure 7:
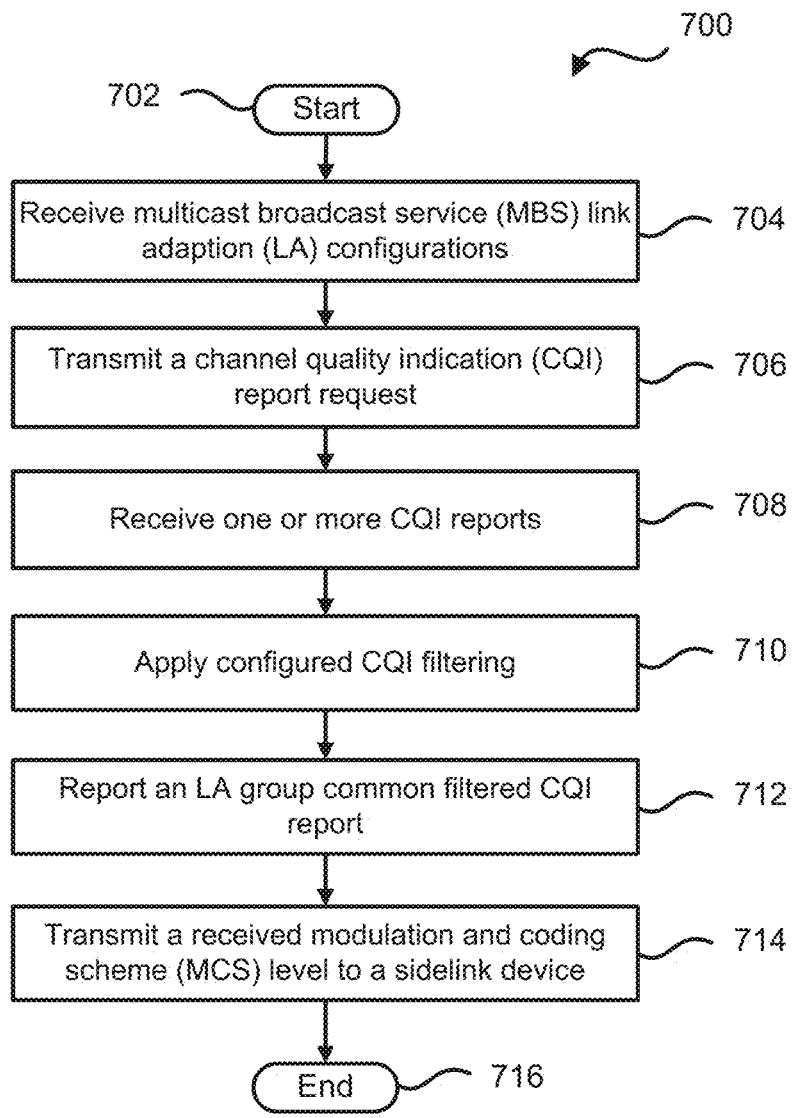
FIG. 7 is a flow diagram of a method for providing a combined group common link adaptation according to an embodiment of the present disclosure.

FIG. 7 is a flow diagram of a method 700 for providing a combined group common link adaptation according to an embodiment of the present disclosure, starting at block 702. In an example, the method 700 may be performed by any suitable component including, but not limited to, processor, such as processor 902 in FIG. 9. Not every method step set forth in this flow diagram is always necessary, and certain steps of the methods may be combined, performed simultaneously, in a different order, or perhaps omitted, without varying from the scope of the disclosure.

At block 704, MBS LA configurations are received. In an example, a MBS device may receive the MBS group LA configurations from a RAN node. The LA configurations may include a LA group ID/RNTI, group LA reporting criteria as of a filtering indication of received CQI levels, or the like. At block 706, a RAN CQI report request may be transmitted. In an example, the CQI report request may be transmitted on a sidelink interface to neighboring devices. The CQI report request may be scrambled by the LA group ID/RNTI, and may include an indication of the strongest selected beam of the source device.

At block 708, one or more RAN CQI reports are received. In an example, the received RAN CQI reports may be from devices in proximity and which are served by the same downlink beam as the requesting MBS device. At block 710, configured RAN CQI filtering is applied. In an example, the RAN CQI filtering may be to calculate an average case, select a worst case, calculate a certain percentile, or the like. At block 712, the filtered LA CQI report is reported or transmitted. In an example, the filtered LA CQI report may be transmitted to a RAN node. At block 714, the received RAN modulation and coding scheme (MCS) level is transmitted, and the flow ends at block 716. In an example, the received an MCS level may be associated with next MBS transmissions from the RAN node. In certain examples, the received RAN MCS level may be transmitted scrambled with the configured group-common LA ID/RNTI to sidelink devices in proximity.

In an example, a primary MBS device may configure secondary sidelink devices in proximity to only transmit their respective LA reports when there is a certain change, such as a preconfigured minimum change threshold of the detected channel conditions, rather than in response to a request from the primary device. In certain examples, the minimum CQI change threshold may be based on dBs or a number of levels. In response to detecting the minimum CQI/SINR channel threshold, the secondary device may provide or transmit a new LA report to primary MBS device in proximity. The primary MBS devices may then filter the received reports and compile a single LA report for transmission to the RAN node.

Figure 8:
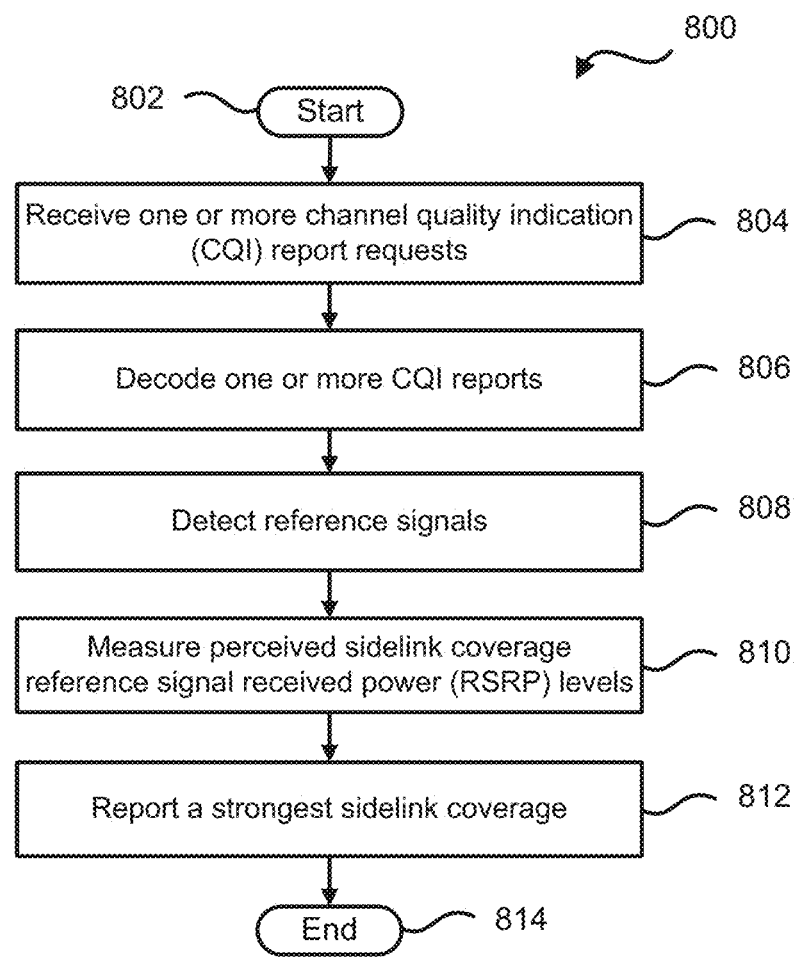
FIG. 8 is a flow diagram of a method for providing a combined group common link adaptation according to an embodiment of the present disclosure.

FIG. 8 is a flow diagram of a method 800 for providing a combined group common link adaptation according to an embodiment of the present disclosure, starting at block 802. In an example, the method 800 may be performed by any suitable component including, but not limited to, processor, such as processor 902 in FIG. 9. Not every method step set forth in this flow diagram is always necessary, and certain steps of the methods may be combined, performed simultaneously, in a different order, or perhaps omitted, without varying from the scope of the disclosure.

At block 804, one or more RAN CQI report requests are received. In an example, the RAN CQI report requests may be received from different primary MBS devices. At block

806, the CQI report request may be decoded. At block 808, one or more reference signals may be detected. At block 810, perceived sidelink coverage reference signal received power (RSRP) levels are measured. At block 812, a strongest sidelink coverage is reported, and the flow ends at block 814. In an example, a MBS device may receive multiple LA report requests from multiple requesting devices. When all the requesting devices are served by the same downlink beam, the MBS device may select the requesting device of the strongest received coverage for LA report transmission and discard received LA report requests from devices of lower coverage levels. The determining of a strongest received sidelink coverage may avoid repetition of the transmission of the same LA reports towards multiple requesting primary MBS devices.

Figure 9:
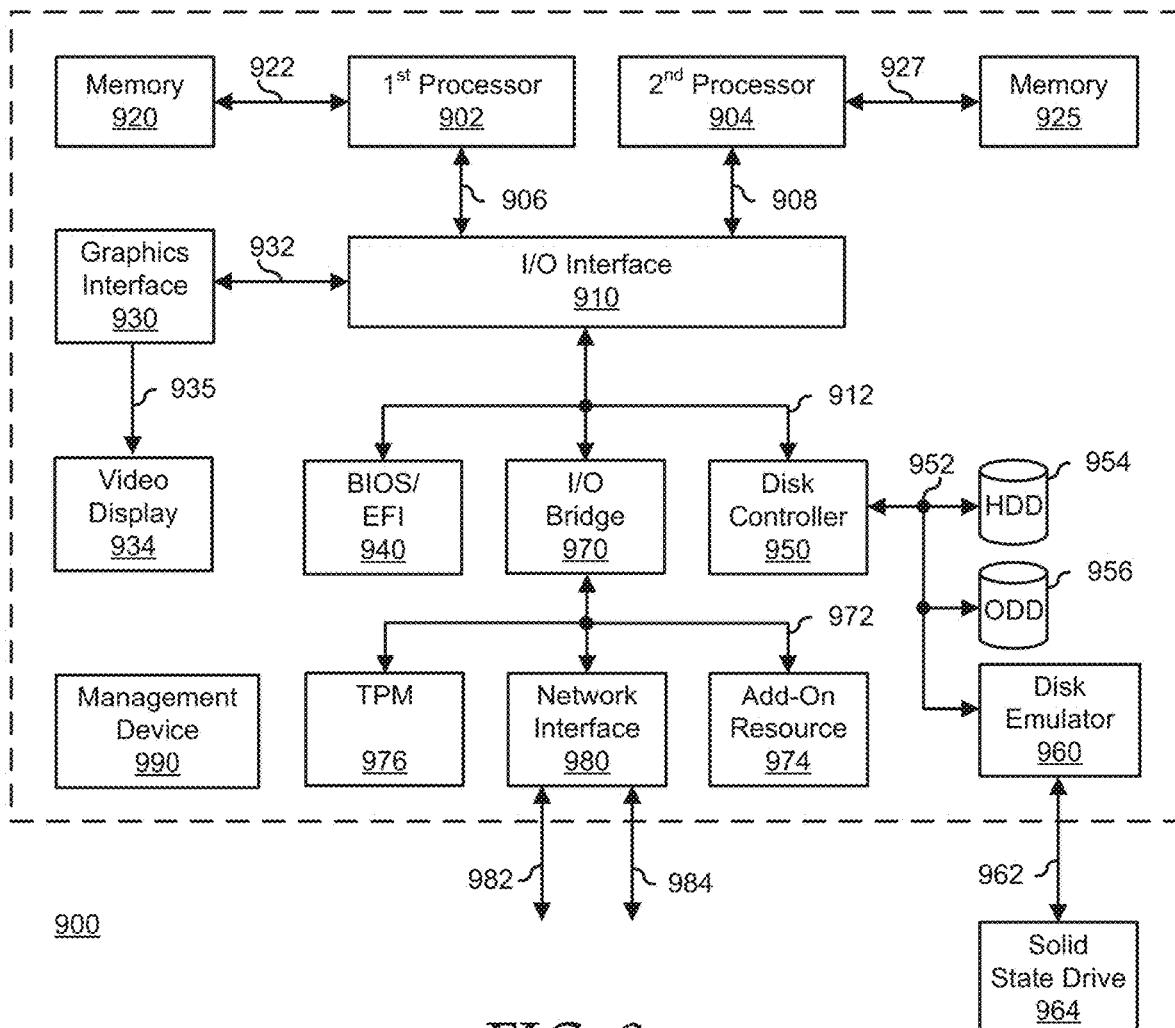
FIG. 9 is a block diagram of a general information handling system according to an embodiment of the present disclosure.

FIG. 9 shows a generalized embodiment of an information handling system 900 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 900 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 900 can include processing resources for executing machine-executable code, such as a central processing unit (CPU), a programmable logic array (PLA), an embedded device such as a System-on-a-Chip (SoC), or other control logic hardware. Information handling system 900 can also include one or more computer-readable medium for storing machine-executable code, such as software or data. Additional components of information handling system 900 can include one or more storage devices that can store machine-executable code, one or more communications ports for communicating with external devices, and various input and output (I/O) devices, such as a keyboard, a mouse, and a video display. Information handling system 900 can also include one or more buses operable to transmit information between the various hardware components.

Information handling system 900 can include devices or modules that embody one or more of the devices or modules described below and operates to perform one or more of the methods described below. Information handling system 900 includes a processors 902 and 904, an input/output (I/O) interface 910, memories 920 and 925, a graphics interface 930, a basic input and output system/universal extensible firmware interface (BIOS/UEFI) module 940, a disk controller 950, a hard disk drive (HDD) 954, an optical disk drive (ODD) 956, a disk emulator 960 connected to an external solid state drive (SSD) 962, an I/O bridge 970, one or more add-on resources 974, a trusted platform module (TPM) 976, a network interface 980, a management device 990, and a power supply 995. Processors 902 and 904, I/O interface 910, memory 920, graphics interface 930, BIOS/UEFI module 940, disk controller 950, HDD 954, ODD 956, disk emulator 960, SSD 962, I/O bridge 970, add-on resources 974, TPM 976, and network interface 980 operate together to provide a host environment of information handling system 900 that operates to provide the data processing functionality of the information handling system.

The host environment operates to execute machine-executable code, including platform BIOS/UEFI code, device firmware, operating system code, applications, programs, and the like, to perform the data processing tasks associated with information handling system 900.

In the host environment, processor 902 is connected to I/O interface 910 via processor interface 906, and processor 904 is connected to the I/O interface via processor interface 908. Memory 920 is connected to processor 902 via a memory interface 922. Memory 925 is connected to processor 904 via a memory interface 927. Graphics interface 930 is connected to I/O interface 910 via a graphics interface 932 and provides a video display output 936 to a video display 934. In a particular embodiment, information handling system 900 includes separate memories that are dedicated to each of processors 902 and 904 via separate memory interfaces. An example of memories 920 and 930 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 940, disk controller 950, and I/O bridge 970 are connected to I/O interface 910 via an I/O channel 912. An example of I/O channel 912 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 910 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 940 includes BIOS/UEFI code operable to detect resources within information handling system 900, to provide drivers for the resources, initialize the resources, and access the resources. BIOS/UEFI module 940 includes code that operates to detect resources within information handling system 900, to provide drivers for the resources, to initialize the resources, and to access the resources.

Disk controller 950 includes a disk interface 952 that connects the disk controller to HDD 954, to ODD 956, and to disk emulator 960. An example of disk interface 952 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 960 permits SSD 964 to be connected to information handling system 900 via an external interface 962. An example of external interface 962 includes a USB interface, an IEEE 3394 (Firewire) interface, a proprietary interface, or a combination thereof. Alternatively, solid-state drive 964 can be disposed within information handling system 900.

I/O bridge 970 includes a peripheral interface 972 that connects the I/O bridge to add-on resource 974, to TPM 976, and to network interface 980. Peripheral interface 972 can be the same type of interface as I/O channel 912 or can be a different type of interface. As such, I/O bridge 970 extends the capacity of I/O channel 912 when peripheral interface 972 and the I/O channel are of the same type, and the I/O bridge translates information from a format suitable to the I/O channel to a format suitable to the peripheral channel 972 when they are of a different type. Add-on resource 974 can include a data storage system, an additional graphics interface, a network interface card (NIC), a sound/video processing card, another add-on resource, or a combination thereof. Add-on resource 974 can be on a main circuit board, on separate circuit board or add-in card disposed within information handling system 900, a device that is external to the information handling system, or a combination thereof.

Network interface 980 represents a NIC disposed within information handling system 900, on a main circuit board of the information handling system, integrated onto another component such as I/O interface 910, in another suitable location, or a combination thereof. Network interface device 980 includes network channels 982 and 984 that provide interfaces to devices that are external to information handling system 900. In a particular embodiment, network channels 982 and 984 are of a different type than peripheral channel 972 and network interface 980 translates information from a format suitable to the peripheral channel to a format suitable to external devices. An example of network channels 982 and 984 includes InfiniBand channels, Fibre Channel channels, Gigabit Ethernet channels, proprietary channel architectures, or a combination thereof. Network channels 982 and 984 can be connected to external network resources (not illustrated). The network resource can include another information handling system, a data storage system, another network, a grid management system, another suitable resource, or a combination thereof.

Management device 990 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 900. In particular, management device 990 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 900, such as system cooling fans and power supplies. Management device 990 can include a network connection to an external management system, and the management device can communicate with the management system to report status information for information handling system 900, to receive BIOS/UEFI or system firmware updates, or to perform other task for managing and controlling the operation of information handling system 900.

Management device 990 can operate off of a separate power plane from the components of the host environment so that the management device receives power to manage information handling system 900 when the information handling system is otherwise shut down. An example of management device 990 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 990 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system within a broadcast system, the information handling system comprising:
    a memory to store a hybrid automatic repeat request (HARQ) acknowledgment/negative acknowledgement (ACK/NACK) codebook; and
    a processor to communicate with the memory, the processor to:
        receive multicast broadcast service (MBS) HARQ configurations;
        receive the HARQ ACK/NACK codebook;
        receive an MBS payload via one of a plurality of available downlink beams;

determine whether a decoding of the payload is successful or failed; and in response to the decoding of the payload having failed, provide a first HARQ preamble on the one of the available downlink beams, wherein the first HARQ preamble identifies that the decoding of the payload has failed on the one of the available downlink beams, wherein the first HARQ preamble is a single HARQ preamble to be transmitted for multiple information handling systems that are geolocated, wherein the multiple information handling systems are geolocated when each of the multiple information handling systems receive the MBS payload from a same downlink beam of the plurality of available downlink beams.

2. The information handling system of claim 1, wherein in response to the MBS payload being received, the processor further to:

transmit a HARQ ACK/NACK report request to a sidelink information handling system;

receive a HARQ ACK/NACK report from the sidelink information handling system; and select the first HARQ preamble based on a combination of the HARQ ACK/NACK and the determination that the decoding of the payload has failed in the information handling system.

3. The information handling system of claim 1, wherein after the HARQ preamble is provided, the processor further to receive a retransmitted MBS payload on the one of the available downlink beams.

4. The information handling system of claim 1, wherein the HARQ ACK/NACK codebook includes a plurality of HARQ preambles including the first HARQ preamble and a second HARQ preamble.

5. The information handling system of claim 4, wherein the first HARQ preamble is associated with a first subset of downlink beams provided in the broadcast system.

6. The information handling system of claim 5, wherein the second HARQ preamble is associated with a second subset of downlink beams provided in the broadcast system.

7. The information handling system of claim 1, wherein the one of the available downlink beams is a strongest downlink beam of the available downlink beams.

8. A method comprising:

receiving, by an information handling system, multicast broadcast service (MBS) hybrid automatic repeat request (HARQ) configurations;

receiving a HARQ acknowledgment/negative acknowledgement (ACK/NACK) codebook;

receiving an MBS payload via one of a plurality of available downlink beams;

determining whether a decoding of the payload is successful or failed; and in response to the decoding of the payload having failed, providing, by the information handling system, a first HARQ preamble on the one of the available downlink beams, wherein the first HARQ preamble identifies that the decoding of the payload has failed on the one of the available downlink beams, wherein the first HARQ preamble is a single HARQ preamble to be transmitted for multiple information handling systems that are geolocated, wherein the multiple information handling systems are geolocated when each of the multiple information handling systems receive the MBS payload from a same downlink beam of the plurality of available downlink beams.

9. The method of claim 8, in response to the MBS payload being received, the method further comprises:

transmitting a HARQ ACK/NACK report request to a sidelink information handling system;

receiving a HARQ ACK/NACK report from the sidelink information handling system; and selecting the first HARQ preamble based on a combination of the HARQ ACK/NACK and the determination that the decoding of the payload has failed in the information handling system.

10. The method of claim 8, wherein after the HARQ preamble is provided, the method further comprises receiving a retransmitted MBS payload on the one of the available downlink beams.

11. The method of claim 8, wherein the HARQ ACK/NACK codebook includes a plurality of HARQ preambles including the first HARQ preamble and a second HARQ preamble.

12. The method of claim 11, wherein the first HARQ preamble is associated with a first subset of downlink beams provided in the broadcast system.

13. The method of claim 12, wherein the second HARQ preamble is associated with a second subset of downlink beams provided in the broadcast system.

14. The method of claim 8, wherein the one of the available downlink beams is a strongest downlink beam of the available downlink beams.

15. A method comprising:

receiving, by an information handling system, multicast broadcast service (MBS) hybrid automatic repeat request (HARQ) configurations;

storing the MBS HARQ configuration in a memory of the information handling system;

receiving a HARQ acknowledgment/negative acknowledgement (ACK/NACK) codebook;

receiving an MBS payload via one of a plurality of available downlink beams, wherein the one of the available downlink beams is a strongest downlink beam of the available downlink beams;

if a decoding of the payload fails, then providing a first HARQ preamble on the one of the available downlink beams, wherein the first HARQ preamble identifies that the decoding of the payload has failed on the one of the available downlink beams, wherein the first HARQ preamble is a single HARQ preamble to be transmitted for multiple information handling systems that are geolocated, wherein the multiple information handling systems are geolocated when each of the multiple information handling systems receive the MBS payload from a same downlink beam of the plurality of available downlink beams; and receiving a retransmitted MBS payload on the one of the available downlink beams.

16. The method of claim 15, in response to the MBS payload being received, the method further comprises:

transmitting a HARQ ACK/NACK report request to a sidelink information handling system;

receiving a HARQ ACK/NACK report from the sidelink information handling system; and selecting the first HARQ preamble based on a combination of the HARQ ACK/NACK and the determination that the decoding of the payload has failed in the information handling system.

17. The method of claim 15, wherein the HARQ ACK/NACK codebook includes a plurality of HARQ preambles including the first HARQ preamble and a second HARQ preamble, wherein each of the HARQ preambles is associated with a different subset of downlink beams.

\* \* \* \* \*